United States Patent
Foerg et al.

(10) Patent No.: US 7,034,414 B1
(45) Date of Patent: Apr. 25, 2006

(54) MOBILE AC-TO-DC POWER CONVERSION SYSTEM

(75) Inventors: Paul Lawrence Foerg, Manchester, NJ (US); Ralph A. Ruffolo, Somerdale, NJ (US)

(73) Assignee: AT&T Corp., New York, NY (US)

( * ) Notice: Subject to any disclaimer, the term of this patent is extended or adjusted under 35 U.S.C. 154(b) by 482 days.

(21) Appl. No.: 10/412,199

(22) Filed: Apr. 11, 2003

(51) Int. Cl.
*H02J 9/00* (2006.01)
*H02J 9/02* (2006.01)
*H02J 9/04* (2006.01)

(52) U.S. Cl. .................. 307/150; 307/82; 290/1 A
(58) Field of Classification Search ............ 290/1 A; 307/82, 150
See application file for complete search history.

(56) References Cited

U.S. PATENT DOCUMENTS

| | | | |
|---|---|---|---|
| 3,717,805 A * | 2/1973 | Gnaedinger et al. | 363/13 |
| 4,117,342 A | 9/1978 | Melley, Jr. | 290/1 A |
| 4,469,954 A | 9/1984 | Maehara | 290/1 A |
| 5,689,412 A * | 11/1997 | Chen | 363/125 |
| 5,801,931 A * | 9/1998 | Kino et al. | 363/17 |
| 6,388,869 B1 | 5/2002 | Fauteux et al. | 361/625 |
| 2002/0030963 A1* | 3/2002 | Benson | 361/625 |
| 2004/0172204 A1* | 9/2004 | Eaton et al. | 702/57 |

* cited by examiner

*Primary Examiner*—Brian Sircus
*Assistant Examiner*—Hal I. Kaplan
(74) *Attorney, Agent, or Firm*—Ronald D. Slusky

(57) ABSTRACT

A mobile AC-to-DC power conversion system that can convert AC power into DC power for use by facilities that require it, such as telecommunications switching offices, thereby enabling telecommunications services supplied by the facility's equipment to be quickly and easily restored. The system may be arranged to be connected to a source of commercial AC power so that if only the facility's DC generation systems are inoperative, i.e., AC power is available at the site, the needed DC power can be generated from that available AC power source. In addition, however, the AC-to-DC power conversion system may also include an AC generator so that DC power can be supplied to the facility in question when no other source of AC power is available.

12 Claims, 8 Drawing Sheets

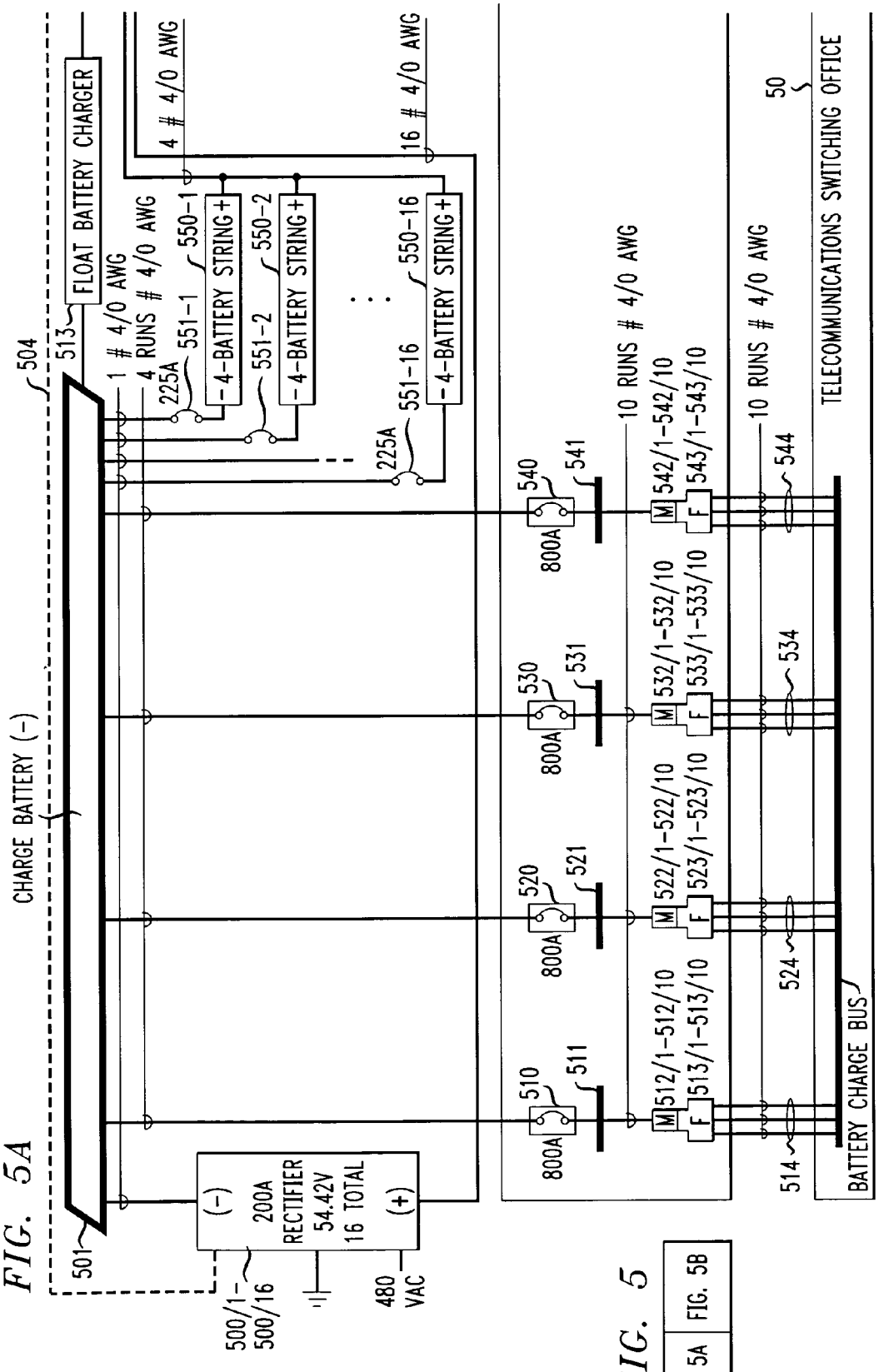

US 7,034,414 B1

MOBILE AC-TO-DC POWER CONVERSION SYSTEM

BACKGROUND OF THE INVENTION

The present invention relates to emergency power systems.

Facilities in which the provision of continuous electrical power is crucial, such as hospitals and telecommunications switching offices, typically include one or more standby power generators that come on line when commercial power is lost. Unfortunately, the facility may not only experience a loss of commercial power, but its generator room may become flooded or the generator otherwise damaged, thereby preventing its use as an emergency power source. In such a case, a mobile AC generation system—typically contained within a trailerable container—can be trucked to the site to provide emergency power until such time as the facility's internal generator can be brought back on line or commercial power is restored.

SUMMARY OF THE INVENTION

Normally the delivery of a mobile AC power system to a switching office that has no commercial or internally generated power solves the facility's need for emergency power. In accordance with the present invention, however, it has been recognized that an important and useful emergency power system would be a mobile AC-to-DC power conversion system-illustratively mounted within a trailerable container, or trailer—that can convert AC power into DC power for use by facilities that require it. For example, telephone switching equipment and other telecommunications equipment typically requires 48-volt DC (VDC) power. Thus on those rare occasions when the facility's internal AC-to-DC rectifier systems have been destroyed due to some natural or man-made disaster, or perhaps vandalism, telecommunications services supplied by the facility's equipment can be quickly and easily restored. To this point in time, the only alternate available in such a situation is to ship in replacement rectifier systems, which are quite large and heavy, and wire them into the existing switching infrastructure on the site. This is a time-consuming process. A further problem is that replacement systems may not be immediately available or, if they are, they may be located a far distance away from the site, thereby delaying restoration of service A mobile AC-to-DC power conversion system embodying the principles of the invention may be arranged to be connected to a source of commercial AC power so that if only the facility's DC generation systems are inoperative, i.e., AC power is available at the site, the needed DC power can be generated from that available AC power source. In addition, however, the present AC-to-DC power conversion system may also include an AC generator so that DC power can be supplied to the facility in question when no other source of AC power is available. The system may also include a source of stored energy—illustratively, a bank of lead-acid batteries—that can supply DC power during transitions between the use of commercial AC power and AC generator power.

In accordance with a feature of the invention, the DC current provided from the trailer is not supplied to the facility being serviced over a single large cable, but rather over a number of cables. There are a number of reasons for this. It needs to be ensured that at least the minimum voltage requirements of the facility being serviced are met. In the case of telephone plant, the voltage drop in the cabling (and the trailer itself) cannot be more than 2 VDC less than the 48 VDC provided by the trailer's rectifier system. A single cable, or even a small handful of cables, having a low enough resistance to meet this requirement would be extremely bulky, difficult to handle and difficult to install at the site. Accordingly, the current is supplied from each panel via a large number of cables comprising relatively small wires that, in the aggregate, can support the needed current supply but are much easier to manipulate. The cables are illustratively connected into the trailer circuitry using single-pole, cam-type connectors.

BRIEF DESCRIPTION OF THE DRAWING

FIGS. 5A and 5B, when arranged as shown in FIG. 5, show the trailer's DC power subsystem;

DETAILED DESCRIPTION OF AN ILLUSTRATIVE EMBODIMENT

Figure 1:
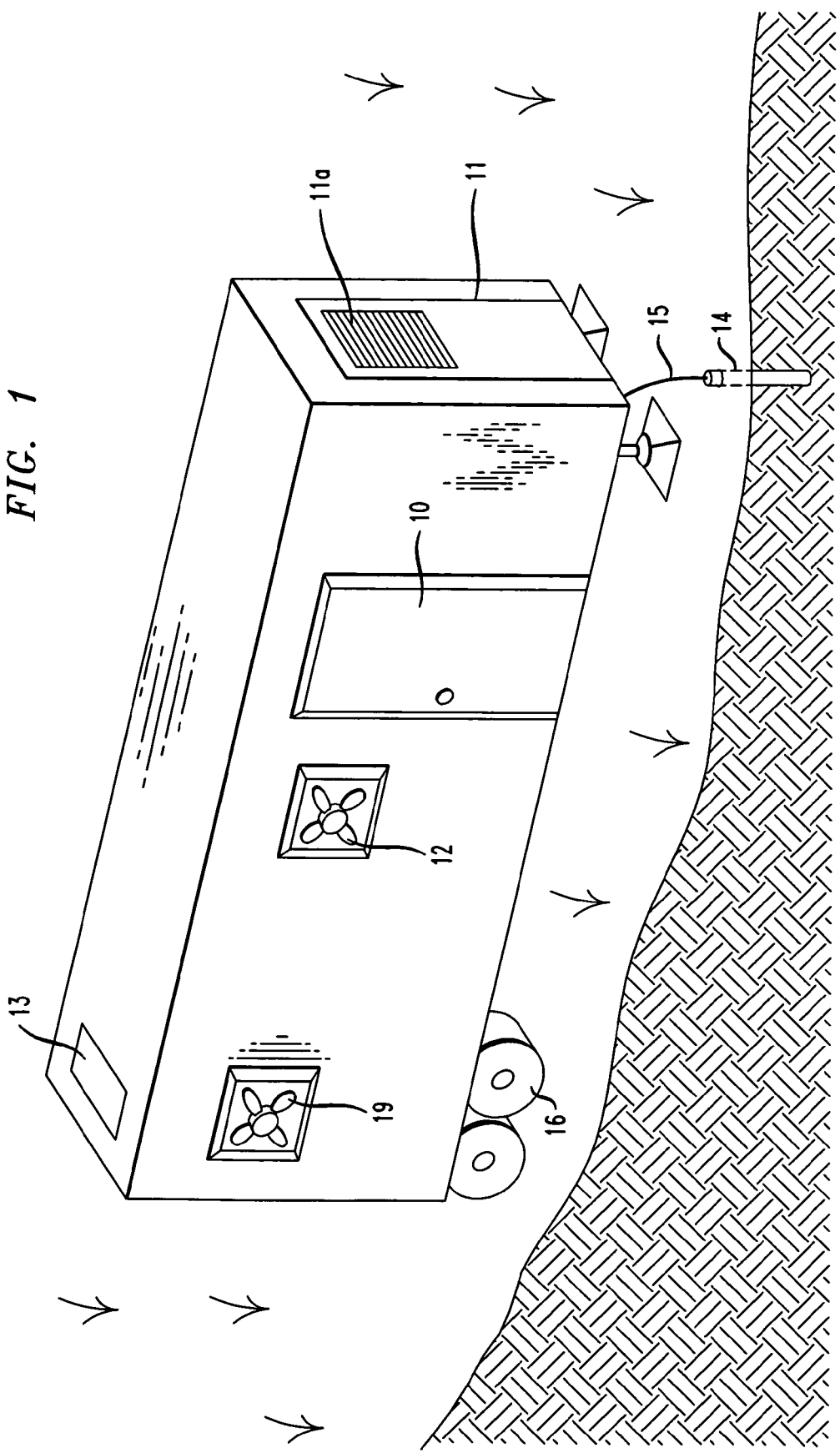
FIG. 1 shows a mobile AC-to-DC power conversion system, illustratively mounted within a trailerable container, or trailer, embodying the principles of the present invention.

Like reference numerals refer to the same parts throughout the specification and drawing.

Figure 2:
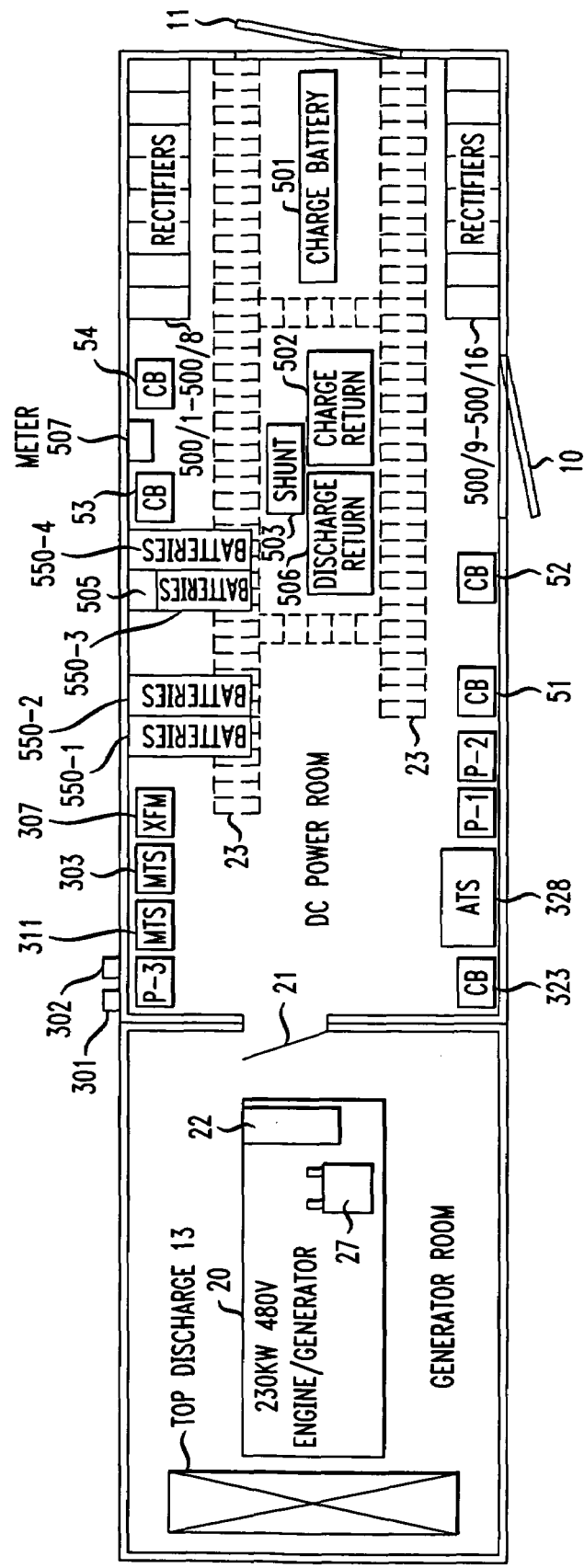
FIG. 2 shows the floor plan of the trailer.

FIG. 1 is an exterior view of the mobile AC-to-DC power conversion system of the present invention and FIG. 2 shows its floor plan. The system is illustratively in the form of a sound-insulated trailerable container, or trailer, having a wheeled undercarriage including wheels 16. The interior of the trailer is partitioned into two rooms—a DC power room and a generator room, with access between them being by way of an interior door 21.

Normal access into the trailer is by way of door 10. A pair of exhaust fans 12 are provided on each side of the trailer within the DC power room. Only one of those fans is visible in the FIG. Fans 12 are used to vent gases given off by batteries within the trailer when they are charging. The trailer also includes an emergency door 11 having a supply air louver 11a that provides a source of outside air when exhaust fans 12 are turned on. A thermostat-controlled exhaust fan 19 is provided on one side of the trailer within the generator room and is used to cool off the interior of the trailer. An air intake grill or louver (not shown) is located on the opposite wall of the trailer. A discharge vent 13 vents exhaust gases generated by a diesel generator contained within the trailer. When the trailer is installed at a site needing DC power, its frame is grounded by way of a cable 15 connected to a grounding rod 14.

The DC power room (FIG. 2) contains the equipment necessary to convert 480-volt AC power (480 VAC) into 48-volt DC power (48 VDC). A cable rack 23 mounted on the ceiling of the trailer carries various electrical cables interconnecting the equipment in the DC power room. Other cabling and wiring extending throughout the trailer is extended though various conduits (not shown). Most of the pieces of equipment contained within the trailer are shown in the floor plan in order to demonstrate how the major components of the overall system could be arranged within the trailer. Each of the pieces of equipment shown in FIG. 2 is discussed below in conjunction with the discussion of the subsystems of which they are a part. The various pieces of equipment within the trailer, including those not shown in FIG. 2 but discussed below, can be placed wherever convenient.

The generator room includes a 230 KW, 480 VAC diesel-powered engine/generator ("generator") 20 that can supply AC power to the DC power room equipment when an external source of 480 VAC power is not available. Generator 20 has an associated control panel 22 and batteries 27 that provide 24 VDC to power the generator's start-up motor. Not shown in the FIG. is a 400-gallon diesel fuel tank mounted within the trailer to provide fuel for the generator, the 400 gallons providing nominally 20 hours of operation under full load conditions.

Figure 3:
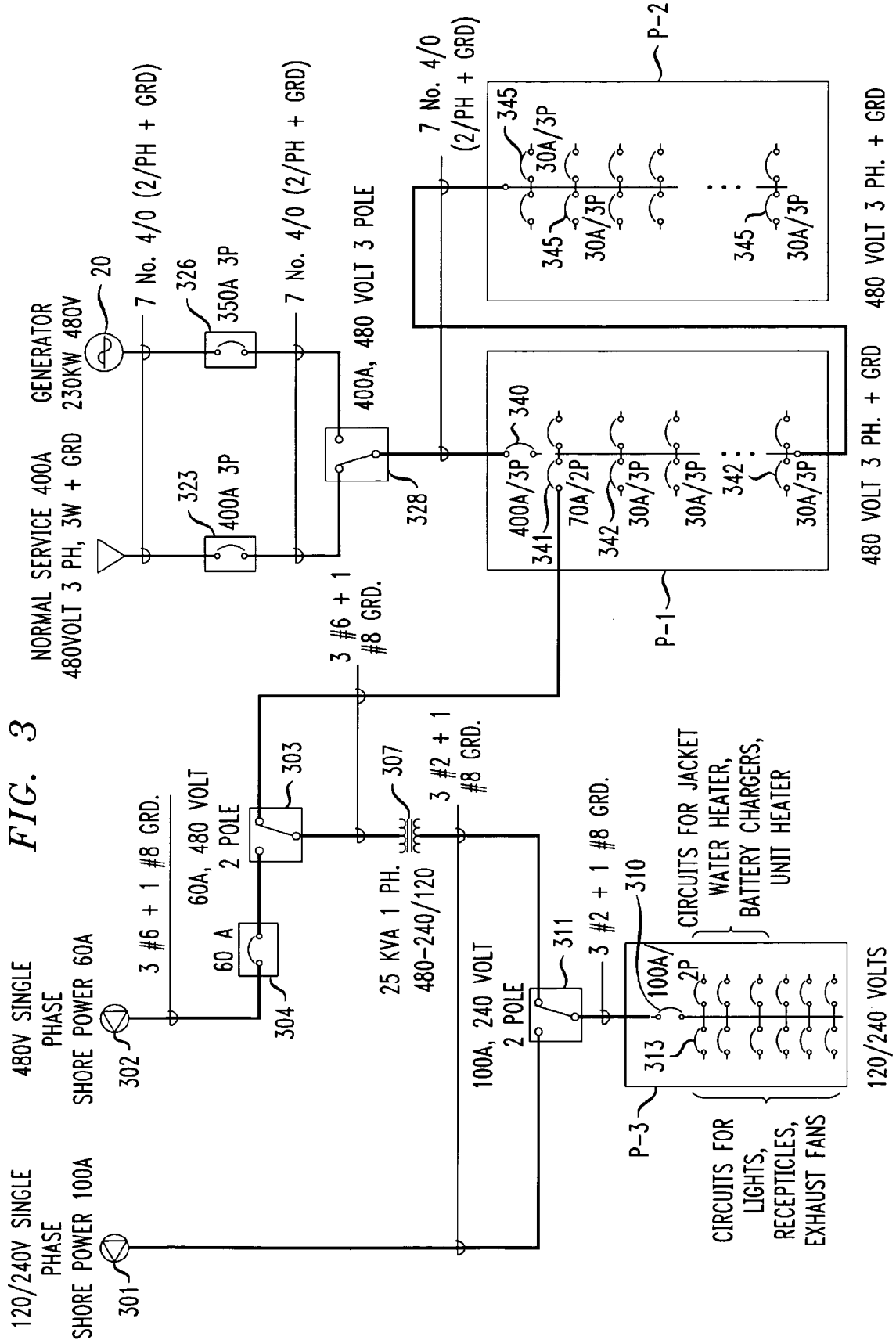
FIG. 3 shows the trailer's AC power distribution subsystem.

FIG. 3 shows the trailer's power distribution subsystem, which distributes three-phase 480 VAC throughout the trailer to equipment that needs it. If 480 VAC commercial power (referred to herein as "normal service") is available at the site to which the trailer has been deployed, that power is supplied by bolting 480 VAC supply cables into circuit-breaker 323, which is connected to electrical panels P-1 and P-2 by way of three-pole automatic transfer switch (ATS) 328. If normal service is not available at the site, that power can be supplied by generator 20 by way of circuit breaker 326 (mounted within generator control panel 22) and automatic transfer switch 328. As long as normal service is available, automatic transfer switch 328 will be in the position shown in FIG. 3, thereby supplying that power to panel P-1. Upon loss of normal service, however, the ATS's control circuitry automatically starts up generator 20 and switches the ATS to supply generator-provided AC to the trailer's equipment.

In this FIG. and, indeed, throughout the drawing, cable runs are identified with standard electrical circuit diagram nomenclature. Thus, for example, the notation "7 No. 4/0 (2/PH+GRD)" associated with the cable run between generator 20 and circuit breaker 326 means that the connection between the two of them comprises seven cables each made up of number 4/0 gauge wire, and each cable has two wires for each electrical phase (2/PH) plus one ground (GRD) wire. This is a three-phase system. Thus, each of the seven cables contains seven wires in total. Other designations used in the FIGS. include A (amperes) and KVA (kilovolt-ampere). Phase is alternatively designated as "PH" or "P". The circuit breakers and various other components throughout the FIGS. are labeled with their current, voltage and/or phase ratings.

Panel P-1 includes a main circuit breaker 340 and panels P-1 and P-2 include between them at least sixteen 30A/3P circuit breakers (not all of which are shown) 342 and 345, respectively, each of which supplies 480 VAC to a respective rectifier of the trailer's AC-to-DC conversion subsystem discussed below. Panel P-1 also includes a 70A/2P breaker that can be used to supply panel P-3 discussed below.

The trailer's AC power distribution subsystem also includes a 120/240-volt house AC power distribution subsystem that includes house electrical panel P-3. If 120/240-volt commercial "shore" power is available at the site to which the trailer has been deployed, that power can be supplied to electrical power connector 301 mounted on the exterior of the trailer. Connector 301 is connected to electrical panel P-3 by way of manual transfer switch (MTS) 311. Even when the trailer is not in use, it needs to be supplied with 120/240-volt shore power during periods of prolonged storage to maintain a charge on its batteries, to maintain a sufficiently warm internal temperature to prevent water condensation on the electrical equipment, and in order to provide power to exhaust fans 12, which are indexed (i.e., selected) to ON in order to prevent buildup of gases resulting from the charging of the trailer's batteries described below.

The house AC power distribution subsystem is also configured to alternatively operate off of 480 VAC power. If 480 VAC commercial shore power is available either at the site where the trailer is stored or to which it has been deployed, that power can be provided to connector 302, which is mounted next to connector 301 on the outside of the trailer. Connector 302 is connected to step-down transformer 307 by way of circuit breaker 304 and manual transfer switch 303. Transformer 307 converts the 480 VAC power to 120/240-volt power, which is extended to panel P-3 by way of manual transfer switch 311. Alternatively, the house AC power distribution system can receive 480 VAC power from panel P-1 by way of breaker 341 and manual transfer switch 303.

House panel P-3 includes main breaker 310 and breakers 313 that supply 120/240-volt power via appropriate cabling to such pieces of auxiliary equipment (not shown) in both the DC power room and the generator room as lights and electrical receptacles, a jacket water heater for generator 20, a battery charger for generator 20, a float battery charger for the trailer's 48 VDC battery strings (discussed below) and a heater to warm the interior of the trailer in cold weather. Panel P-3 also supplies power to exhaust fans 12 and 19 and their associated dampers.

Figure 4:
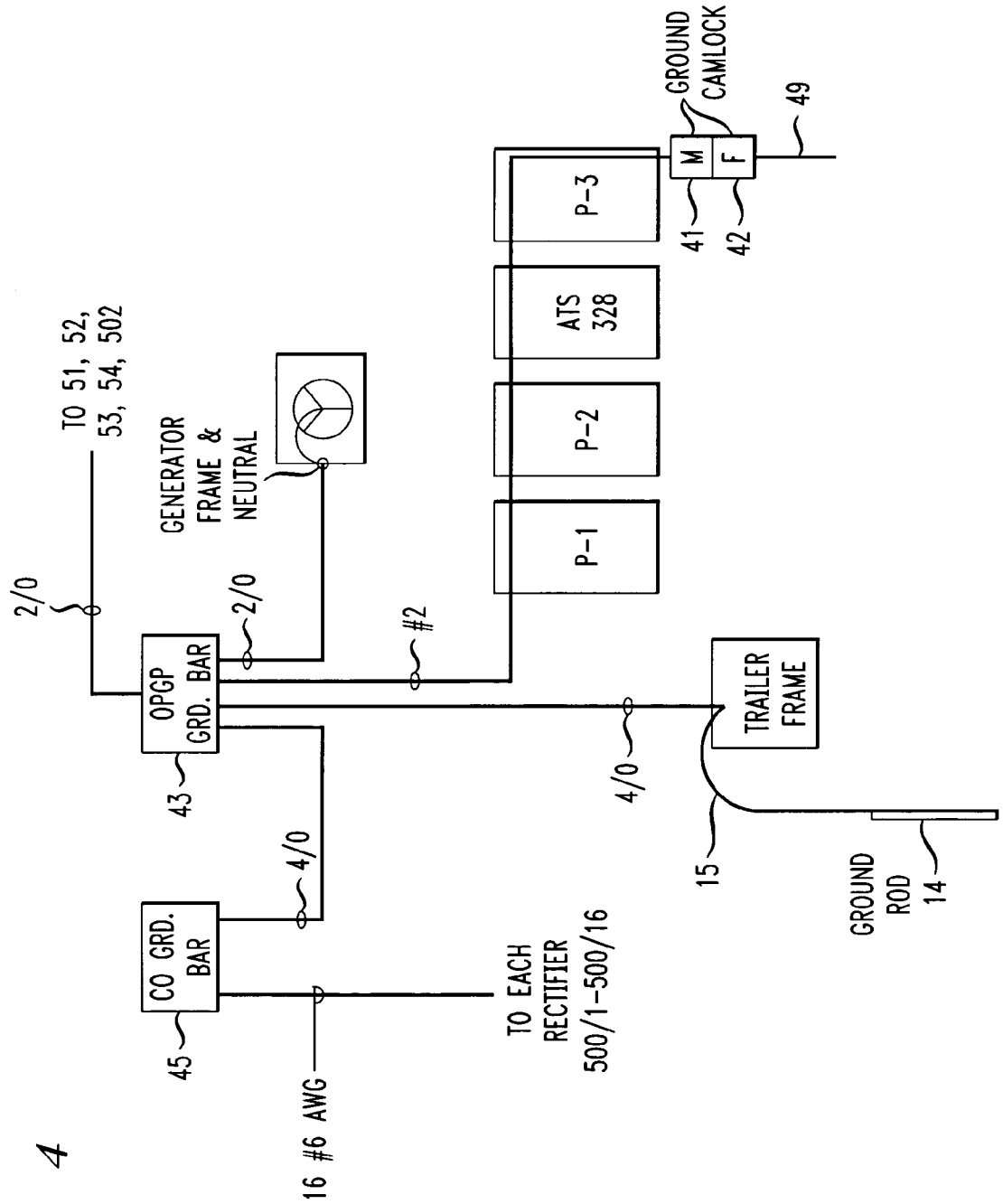
FIG. 4 shows the trailer's grounding subsystem.

The trailer's grounding system is shown in FIG. 4. External ground potential associated with the telecommunications switching office or other facility at the site to which the trailer may be deployed is extended to the trailer via a cable 49 terminating on a female camlock connector 42 introduced from the underside of the trailer. Female camlock connector 42 would be mated to male camlock connector 41 that is bolted to the interior of panel P-3. Camlock connectors 41 and 42, as well as all the other camlock connectors used in the trailer and discussed herein, may be, for example, single pole "cam-type" connectors available from Leviton Manufacturing Company and described in product brochure G5769/L0-6M rs © 2000, entitled "Single Pole Cam-Type Connectors".

Ground potential received on cable 49 is referred to as office principal ground. This potential is extended from panel P-3 to the various pieces of equipment throughout the trailer including panels P-1 and P-2, automatic transfer switch 328 and Office Principal Ground Port (OPGP) bus bar 43. Office principal potential is thereupon extended from bus bar 43 to the frame of generator 20 and to its neutral within control panel 22; to the trailer frame and thence via cable 15 to ground rod 14, as a safety ground; to various equipment within the DC power subsystem shown in FIGS. 5A–5B, including four DC circuit breaker panels 51 through 54 and charge return (+) bus 502. Office principal ground is also extended to CO (Central Office) ground bar 45 from which ground is extended to each of the sixteen rectifiers 500/1 through 500/16 of the DC power distribution subsystem. Ground bars 43 and 45 are mounted with standoffs at convenient locations on one or more interior wall(s) of the trailer.

Figure 5B:
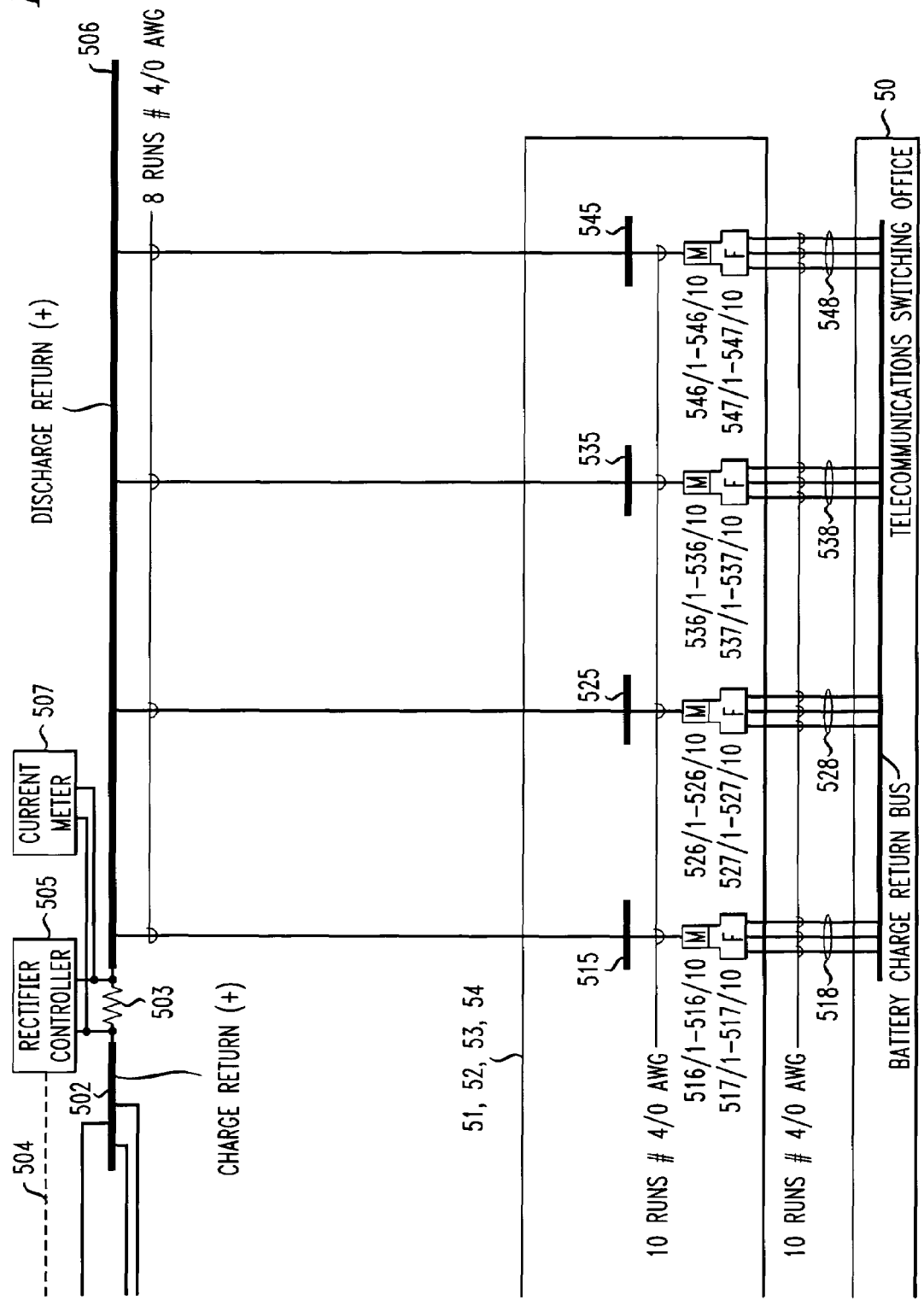

FIGS. 5A–5B show the trailer's DC power subsystem, at the heart of which is an AC-to-DC conversion subsystem comprising sixteen rectifier systems 500/1 through 500/16. These are illustratively Model J885503-B1 rectifiers available from Tyco Electronics Power Systems. As previously noted, rectifiers receive office principal ground from bus 45 and 480 VAC from panels P-1 and P-2. The negative (−) output of each of rectifiers 500/1 through 500/16 provides 48 VDC onto charge battery (−) bus 501. Each of rectifiers 500/1 through 500/16 is rated for 200 A, yielding a total DC current capacity for the trailer of 3200 A.

The DC power subsystem also includes a DC power distribution subsystem, the latter including four DC circuit breaker panels 51, 52, 53 and 54, each receiving −48 VDC from bus 501. As can be seen in FIG. 2, these are individual circuit breaker panels mounted at convenient positions within the trailer. For drawing simplicity in FIGS. 5A–5B, these four individual circuit breaker panels are designed by a single box labeled "51, 52, 53, 54." The components within any given one of the circuit breaker panels are labeled with reference numerals whose first two digits are the same as the circuit breaker in which they are installed or mounted. Thus, for example, circuit breaker panels 51, 52, 53 and 54 include circuit breakers 510, 520, 530 and 540, respectively, to which the −48 VDC from bus 501 is applied. These are 800A circuit breakers, each thus being able to carry one-fourth of the aggregate 3200A current that can be supplied by rectifiers 500/1 through 500/16.

The DC current provided from each panel is not supplied to the facility being serviced over a single large cable, but rather over a number of supply cables. There are a number of reasons for this. It needs to be ensured that at least the minimum voltage requirements of the facility being serviced are met. In the case of telephone plant, the voltage drop in the cabling (and the trailer itself) cannot be more than 2 VDC less than the 48 VDC provided by rectifiers 500/1 through 500/16. A single cable, or even a small handful of cables, having a low enough resistance to meet this requirement would be extremely bulky, difficult to handle and difficult to install at the site. Accordingly, the current is supplied from each panel via a large number of cables comprising relatively small, illustratively 4/0 gauge wires that, in the aggregate, can support the needed current supply but are much easier to manipulate. Similar considerations apply to return cables that carry return current from the facility back into the trailer.

Thus focusing on panel 51, in particular, it will be seen that its DC current output is divided among ten on-board male DC supply camlock connectors 512/1 through 512/10, which are mounted on the exterior of the panel. The current path from circuit breaker 510 to camlock connectors 512/1 through 512/10 is by way of a supplemental bus 511 mounted within panel 51. As shown in the drawing, ten individual cables extend from circuit breaker 510, each of these terminating on one of the ten connectors 512/1 through 512/10. For drawing simplicity, only one of the connectors 512/1 through 512/10 is explicitly shown. When the trailer is on site and supplying DC power to a utilization facility such as telecommunications switching office 50, also shown in FIGS. 5A–5B, supply cables 514 are bolted at one end to the so-called battery charge bus within office 50. The other end of each of supply cables 514 is introduced into panel 51 from the underside of the trailer. Each of these cables terminates in one of ten so-called 3-FER multiway female-male-male-male ("female") DC supply camlock connectors 513/1 through 513/10, such as Leviton's camlock connector 16A26. For drawing simplicity, only one of the cable-connected connectors 513/1 through 513/10 is explicitly shown. Connectors 513/1 through 513/10 are mated to male camlock connectors 512/1 through 512/10, respectively, once the trailer is brought to the site and is being configured to supply DC to office 50. Thus cables 514 can comprise as many as 30 individual cables, with three cables terminating on each of the ten 3-FER female camlock connectors. Not all of these cables or camlock connections need be used in a given application; this will depend on the current requirements of the facility being supplied. Cables terminating in a single female camlock connector, rather than a 3-FER, could be used if less than the full set of cable connections is needed.

Panels 52, 53 and 54 are similarly equipped, with their supply connectors and supply cables being labeled similarly to those in panel 51 except beginning with "52," "53," or "54."

Panels 51, 52, 53 and 54 each include further circuitry for the current return path. For example, as many as 18 return cables 518 are bolted onto the switching office's battery charge return bus. These cables, terminating in female 3-FER camlock DC return connectors 517/1 through 517/10, extend into the trailer from its underside and mate with on-board male DC return camlock connectors 516/1 through 516/10, respectively, bolted to the outside of panel 51. Those ten male connectors are, in turn, connected to a so-called supplementary bus 515 within panel 51. For drawing simplicity, only one of the cable-connected female connectors 517/1 through 517/10 is explicitly shown in the FIG. and likewise for on-board male connectors 516/1–516/10.

Again, panels 52, 53 and 54 are similarly equipped, with their corresponding return cables, return connectors and buses being labeled similarly to those in panel 51 except beginning with "52," "53," or "54."

Supplementary buses 515, 525, 535 and 545 are connected to discharge return (+) bus 506. The current gathered at bus 506 passes through a 4000A shunt 503, thence to charge return (+) bus 502 and thence over individual cables to the positive (+) terminals of rectifiers 500/1 through 500/16, thereby completing the circuit. (Individual cables, rather than one larger cable, are used to make connections within the trailer because they are more flexible, thus making it easier to bend them around the trailer's interior than would be the case with a single cable of appropriate gauge.)

The on/off state of rectifiers 500/1 through 500/16 is controlled by rectifier controller 505, depending on how much current is being demanded by switching office 50. Rectifier controller 505 is illustratively a Model J885501-A2 rectifier available from Tyco Electronics Power Systems. Rather than requiring the rectifier controller to be able to measure such a large current flow directly, the rectifier controller is connected across shunt 503, the voltage drop across shunt 503 being directly proportional to the current flow. A current meter 507 is similarly connected across shunt 503. Control leads 504 are provided between rectifier controller 505 and rectifiers 500/1 through 500/16, enabling the rectifier controller to turn rectifiers 500/1 through 500/16 on and off as needed in order to accommodate the current demand of office 50 and also to monitor the rectifiers' operation. Rectifier controller 505 also controls the sequencing of rectifier turn-on or turn-off during periods of transition between rectifier—supplied DC and battery-supplied DC as described below.

If the trailer is being operated from normal 480 VAC power and then that source of power is lost, the control circuitry of automatic transfer switch 328 automatically starts up generator 20. It may take about 10–15 seconds for the generator to start and for the transfer from normal to generator-provided power to occur. During that time, 48 VDC is provided by sixteen strings 550-1 through 550-16 of valve-regulated 12 VDC 100-ampere-hour lead-acid batteries, such as Dynasty MPS12-100 batteries. Each string comprises 4 such batteries connected in series. Battery strings 550-1 through 550-16, in total, are able to supply as much DC current as rectifiers 500/1 through 500/16. The negative end of each of the strings of batteries 550-1 through 550-16 is connected to charge battery (–) bus 501 through a respective one of 225A circuit breakers, 551-1 through 551-16. The positive end of each of the battery strings is connected to charge return (+) bus 502.

Under normal operating conditions, the batteries should not be in discharge for more than 30 seconds. Once commercial 480 VAC power has been restored, automatic transfer switch 328 will time out after a nominal time-out period of 20 minutes and transfer the trailer back to commercial power. Automatic transfer switch 328 is arranged for programmed transition in that it pauses in the neutral position for nominally 5 seconds, during which time the trailer provides DC power by way of battery strings 550-1 through 550-16. Rectifier controller 505 sequences rectifiers 500/1 through 500/16 on after the 480 VAC power has been restored. Automatic transfer switch 328 will cause generator 20 to continue to operate for a cool-down period of nominally 5 minutes after restoration to commercial power has occurred.

A so-called float battery charger 513 connected between charge battery (–) bus 501 and charge return (+) bus 502 keeps battery strings 550-1 through 550-16 charged when the trailer is in storage.

Figure 6:
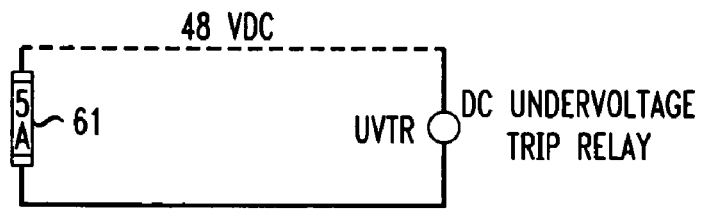
FIG. 6 shows the trailer's DC undervoltage trip relay circuitry.
Figure 7:
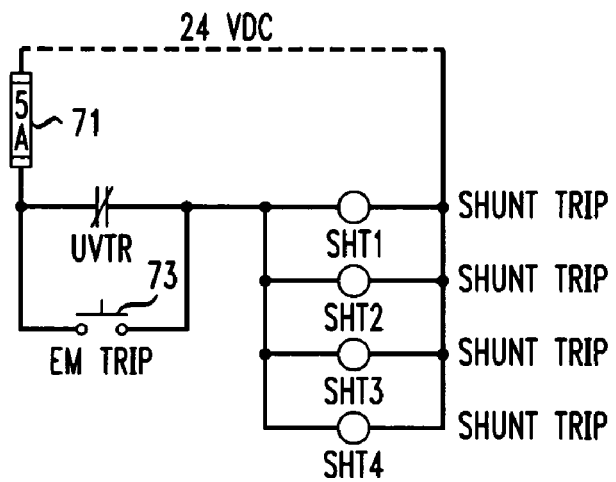
FIG. 7 shows the trailer's emergency circuit breaker shunt trip circuitry.

FIG. 6 shows the trailer's DC undervoltage trip relay circuitry, comprising a fuse 61 and the coil (not shown) of an under-voltage trip relay UVTR both located within breaker panel 51. In the event that the DC voltage supplied by the trailer drops below nominally 46 volts, circuit breakers 510, 520, 530 and 540 will be tripped by the circuitry of FIG. 7 to prevent complete discharge of the batteries in battery strings 550-1 through 550-16. In particular, the circuitry of FIG. 7 is powered by the 24 VDC of generator batteries 27 via generator control panel 22. That circuitry comprises a fuse 71 within panel 22; the contacts of the undervoltage trip relay UVTR; an emergency trip switch 73 located at some convenient place within the trailer, and circuit breaker shunt trips SHT1 through SHT4 located within breaker panels 51 through 54, respectively. Thus the supply of DC current will be interrupted either automatically, if the supplied DC voltage drops below 46 VDC, or manually via the operation of switch 73. Once tripped, circuit breakers 510, 520, 530 and 540 must be manually reset. The 46-volt drop-out setting may be adjusted depending on the requirements of the facility being supplied with DC power by the trailer.

Figure 8:
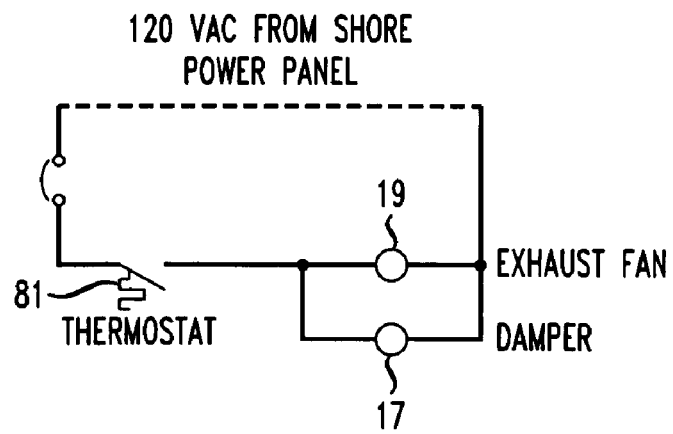
FIG. 8 shows exhaust fan circuitry for the trailer's generator room.

FIG. 8 shows exhaust fan circuitry for the generator room. In particular, if the ambient temperature in the generator room exceeds some preset limit, thermostat 81 supplies 120-volt house power to both exhaust fan 19 and an associated damper 17.

Figure 9:
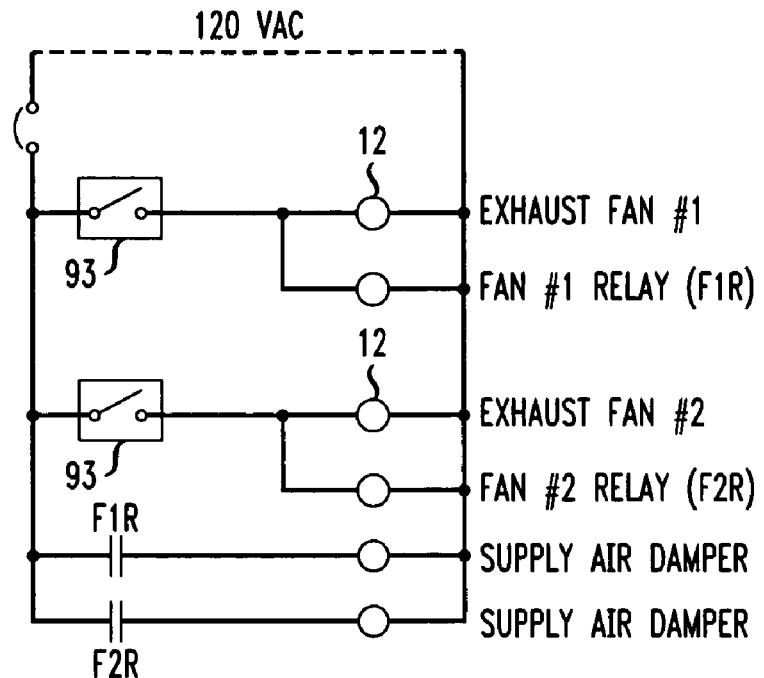
FIG. 9 shows the exhaust fan circuitry for the trailer's DC power room.

FIG. 9 shows the exhaust fan circuitry for the DC power room. Exhaust fans 12, labeled as exhaust fan #1 and exhaust fan #2 in the FIG., are turned on by closing a respective one of switches 93 to provide 120-volt house power to the fans. Closing switches 93 also actuates respective relays F1R and F2R, thereby applying house power to respective dampers associated with fans 12.

Figure 10:
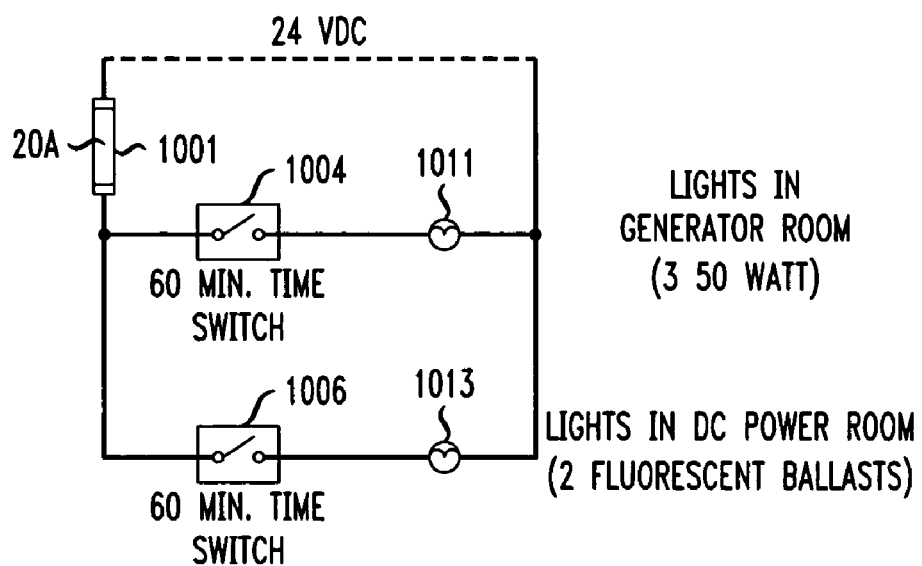
FIG. 10 shows the emergency light circuitry for the both the generator room and DC power room.

FIG. 10 shows the emergency light circuitry for both the generator room and DC power room. These lights are powered by 24 VDC via fuse 1001 within the generator control panel 22. In particular, incandescent lights 1011 in the generator room and fluorescent lights 1013 in the DC power room are activated by 60-minute-timer switches 1004 and 1006, respectively, mounted within the generator room and DC power room, respectively.

Certain actions should be taken when the trailer is in storage. Even when in storage, the trailer must be provided with shore power, as previously noted. In particular, the exhaust fans in the DC power room must be indexed to, i.e., selected, ON at all times to vent any built-up battery gases. The generator control switch must be indexed to OFF to prevent generator startup.

When the trailer is deployed to a site requiring DC power, the 48 VDC power requirements for the facilities being serviced must be determined on a site-specific basis and connected accordingly. These measures may include turning on only some of rectifiers 500/1 through 500/16 and/or disconnecting one or more of the battery strings 550-1 through 550-16 from the DC circuitry by indexing to OFF their respective circuit breakers 551-1 through 551-16. The on-site distribution system must be thoroughly investigated so as not to violate the integrity of the grounding system. The generator must be indexed for AUTO operation on generator control panel 22. For extended operation, a supplementary source of diesel fuel may need to be provided at the site and the additional fuel hosed or otherwise inserted into the trailer's internal fuel tank. Exhaust fans 12 should be indexed to ON to prevent battery gas build-up.

The foregoing merely describes various illustrative embodiments of the invention. Those skilled in the art will be able to devise numerous alternative arrangements which, although not explicitly shown or described herein, embody the principles of the invention and are thus within its spirit and scope.

The invention claimed is:

1. Apparatus comprising
    a mobile container, said mobile container having mounted therewithin,
    an AC-to-DC conversion subsystem,
    an AC power distribution subsystem for supplying AC power to said AC-to-DC conversion subsystem, and
    a DC power distribution subsystem for supplying, to equipment external to said AC-to-DC conversion subsystem, DC power generated by said AC-to-DC conversion subsystem,
    wherein said AC-to-DC conversion subsystem includes a plurality of rectifier systems adapted to convert AC power supplied at an integer multiple of 120 volts to DC power at at least 48 volts,
    and wherein said DC power distribution subsystem includes
        means for combining the current output of said rectifier systems,
        means for applying respective portions of said current output onto a plurality of supply cables connected to a utilization facility,
        means for receiving respective portions of return current from a plurality of return cables connected to said utilization facility, and
        means for applying the return current to said rectifier systems.

2. The invention of claim 1 wherein
    said means for applying includes means for distributing said respective portions of said current output to a plurality of on-board connectors adapted to mate with a plurality of connectors to which said supply cables are connected, and wherein said means for receiving includes means for receiving said respective portions of said return current from a plurality of on-board connectors adapted to mate with a plurality of connectors to which said return cables are connected.

3. The invention of claim 2 wherein said on-board connectors and cable-connected connectors comprise single-pole cam-type connectors.

4. Apparatus comprising a mobile container, said mobile container having mounted therewithin, an AC-to-DC conversion subsystem, an AC power distribution subsystem for supplying AC power to said AC-to-DC conversion subsystem, and a DC power distribution subsystem for supplying, to equipment external to said AC-to-DC conversion subsystem, DC power generated by said AC-to-DC conversion subsystem, wherein said AC-to-DC conversion subsystem includes a plurality of rectifier systems adapted to convert AC power supplied at an integer multiple of 120 volts to DC power at at least 48 volts, and wherein said DC power distribution subsystem further includes a first bus electrically connected to a negative terminal of each of said rectifier systems, a plurality of single-pole on-board supply connectors electrically connected to said first bus, a plurality of cable-connected single-pole supply connectors each adapted to mate with a respective one of the on-board supply connectors, each of said cable-connected supply connectors having electrically connected thereto at least one supply cable adapted to be electrically connected to a charge bus within a utilization facility, a second bus electrically connected to a positive terminal of each of said rectifier systems, a plurality of single-pole on-board return connectors connected to said second bus, and a plurality of cable-connected single-pole return connectors each adapted to mate with a respective one of the on-board return connectors, each of said cable-connected return connectors having electrically connected thereto at least one return cable adapted to be electrically connected to a charge return bus within the utilization facility.

5. The invention of claim 4 wherein a first plurality of said on-board supply connectors are connected to said first bus through a first circuit breaker, and a second plurality of said on-board supply connectors are connected to said first bus through a second circuit breaker.

6. The invention of claim 4 wherein said on-board connectors and said cable-connected connectors are cam-type connectors.

7. The invention of claim 6 wherein two or more of said cable-connected supply connectors have electrically connected thereto at least two of said supply cables, and wherein two or more of said cable-connected return connectors have electrically connected thereto at least two of said return cables.

8. Apparatus comprising a mobile container, said mobile container having mounted therewithin, an AC-to-DC conversion subsystem, an AC power distribution subsystem for supplying AC power to said AC-to-DC conversion subsystem, and a DC power distribution subsystem for supplying, to equipment external to said AC-to-DC conversion subsystem, DC power generated by said AC-to-DC conversion subsystem, wherein said mobile container further includes auxiliary equipment including at least one of a) an exhaust system, b) an internal lighting system and c) internal electrical receptacles, and wherein said mobile container further includes a house AC power distribution subsystem for providing AC power to said auxiliary equipment from a selectable one of at least a) said AC power distribution subsystem and b) means for receiving AC power from a source external to said container.

9. The invention of claim 8 wherein said means for receiving includes at least a first 120-volt power connector and at least a first 480-volt power connector, and wherein said house AC power distribution subsystem includes switching means for selecting among a) said AC power distribution subsystem, b) said 120-volt power connector and c) said 480-volt power connector.

10. Apparatus comprising a mobile container having a wheeled undercarriage enabling said mobile container to be trailered to a desired location, said mobile container having mounted therewithin, a) an AC-to-DC conversion subsystem including a plurality of rectifier systems adapted to convert AC power supplied at an integer multiple of 120 volts to DC power at at least 48 volts, b) an AC power distribution subsystem including means for supplying AC power to said AC-to-DC conversion subsystem from a source external to said container, c) a DC power distribution subsystem for supplying, to equipment external to said AC-to-DC conversion subsystem, DC power generated by said AC-to-DC conversion subsystem, said DC power distribution subsystem including i) means for combining the current output of said rectifier systems, ii) means for applying respective portions of said current output onto a plurality of supply cables connected to a utilization facility, said means for applying including means for distributing said respective portions of said outgoing current to a plurality of on-board single-pole cam-type connectors adapted to mate with a plurality of single-pole cam-type connectors to which said supply cables are connected, iii) means for receiving respective portions of return current from a plurality of return cables connected to said utilization facility, said means for receiving including means for receiving said respective portions of said return current from a plurality of on-board connectors adapted to mate with a plurality of connectors to which said return cables are connected, and iv) means for combining said portions of return current and returning it to said rectifier systems, d) a battery subsystem capable of providing DC power to said DC power distribution subsystem in the event that AC power to said AC-to-DC conversion subsystem is interrupted, e) auxiliary equipment including at least one of
   i) an exhaust system,
   ii) an internal lighting system, and
   iii) internal electrical receptacles
and f) a house AC power distribution subsystem for providing AC power to said auxiliary equipment from a selectable one of
   i) said AC power distribution subsystem
   ii) a 120-volt power connector, and
   iii) a 480-volt power connector.

11. The invention of claim 10 further comprising an AC power generator, and wherein said AC power distribution subsystem includes an automatic transfer switch for supplying AC power to said AC-to-DC conversion subsystem from one of a) said external source and b) said AC power generator.

12. The invention of claim 11 wherein two or more of said cable-connected supply connectors have electrically connected thereto at least two of said supply cables, and wherein two or more of said cable-connected return connectors have electrically connected thereto at least two of said return cables.

* * * * *